United States Patent
Matsubara et al.

(10) Patent No.: US 11,817,561 B2
(45) Date of Patent: Nov. 14, 2023

(54) ELECTROLYTE AND SECONDARY BATTERY

(71) Applicant: Panasonic Intellectual Property Management Co., Ltd., Osaka (JP)

(72) Inventors: Kenji Matsubara, Osaka (JP); Nobuhiko Hojo, Osaka (JP); Hiroyuki Matsumoto, Osaka (JP); Atsushi Fukui, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/054,890

(22) PCT Filed: Feb. 19, 2019

(86) PCT No.: PCT/JP2019/006015
§ 371 (c)(1),
(2) Date: Nov. 12, 2020

(87) PCT Pub. No.: WO2019/225081
PCT Pub. Date: Nov. 28, 2019

(65) Prior Publication Data
US 2021/0367273 A1     Nov. 25, 2021

(30) Foreign Application Priority Data

May 21, 2018   (JP) .................................. 2018-097281

(51) Int. Cl.
H01M 10/36   (2010.01)
(52) U.S. Cl.
CPC .... H01M 10/36 (2013.01); H01M 2300/0002 (2013.01)

(58) Field of Classification Search
CPC ............. H01M 10/36–39; H01G 11/54; H01G 11/58–64; H01G 9/038; H01G 9/155
See application file for complete search history.

(56) References Cited

U.S. PATENT DOCUMENTS

| | | | |
|---|---|---|---|
| 2010/0136427 A1 | 6/2010 | Kondo et al. | |
| 2012/0141884 A1* | 6/2012 | Takahata | H01M 10/0567 429/332 |

(Continued)

FOREIGN PATENT DOCUMENTS

| | | |
|---|---|---|
| JP | 2016-072232 A | 5/2016 |
| JP | 2017-174597 A | 9/2017 |

(Continued)

OTHER PUBLICATIONS

Notification Concerning Transmittal of International Preliminary Report on Patentability (Forms PCT/IB/326) issued in counterpart International Application No. PCT/JP2019/006015 dated Dec. 3, 2020 with Forms PCT/IB/373, PCT/IB/338, PCT/IB/308 and PCT/ISA/237. (17 pages).

(Continued)

*Primary Examiner* — Jonathan Crepeau
*Assistant Examiner* — Jacob Buchanan
(74) *Attorney, Agent, or Firm* — WHDA, LLP

(57) ABSTRACT

An electrolyte solution according to one aspect of the present disclosure comprises water, a lithium salt, and a polycarboxylic acid having two or more carboxylic acid groups. A secondary battery according to one aspect of the present disclosure comprises a positive electrode, a negative electrode, and the electrolyte solution.

4 Claims, 8 Drawing Sheets

(56) References Cited

U.S. PATENT DOCUMENTS

2017/0279159 A1    9/2017  Suyama et al.
2017/0373351 A1   12/2017  Kawai et al.
2019/0044190 A1    2/2019  Yamada et al.

FOREIGN PATENT DOCUMENTS

| JP | 2018-181420 A | 11/2018 |
| WO | 2009/008280 A1 | 1/2009 |
| WO | 2016/114141 A1 | 7/2016 |
| WO | 2017/122597 A1 | 7/2017 |

OTHER PUBLICATIONS

International Search Report dated Apr. 2, 2019, issued in counterpart application No. PCT/JP2019/006015, w/English translation (7 pages).
Written Opinion dated Apr. 2, 2019, issued in counterpart application No. PCT/JP2019/006015 (5 pages).

* cited by examiner

ELECTROLYTE AND SECONDARY BATTERY

TECHNICAL FIELD

The present disclosure relates to an electrolyte solution, and more particularly to an electrolyte solution for a secondary battery and a lithium ion secondary battery using the same.

BACKGROUND

As electrolyte solutions for lithium ion secondary batteries, there are known nonaqueous electrolyte solutions containing an organic solvent as their main component and containing no water, and aqueous electrolyte solutions containing water as their main component.

Patent Literature 1 discloses an electrolyte solution for a power storage device, which contains water as a solvent, and in which the amount of the solvent is 4 mol or less per mol of an alkaline metal salt, and a power storage device having the electrolyte solution. Patent Literature 2 discloses an electrolyte solution for a power storage device, which contains water as a solvent, and in which the amount of the solvent is more than 4 mol and 15 mol or less per mol of an alkaline metal salt, and a power storage device having the electrolyte solution.

CITATION LIST

PATENT LITERATURE

Patent Literature 1: International Publication No. WO2016/114141
Patent Literature 2: International Publication No. WO2017/122597

SUMMARY

Technical Problem

Although secondary batteries using an aqueous solvent for their electrolyte solutions have excellent safety compared with nonaqueous electrolyte secondary batteries using an organic solvent for their electrolyte solutions, since the secondary batteries have a narrow potential region, that is, a narrow potential window where the solvent water is not oxidatively or reductively electrolyzed, the applicable voltage is restricted.

An object of the present disclosure is to provide an electrolyte solution which may extend the potential region where no electrolysis occurs, and enable a lithium ion secondary battery which is safe and high in voltage and high in capacity.

Solution to Problem

An electrolyte solution according to one aspect of the present disclosure comprises water, a lithium salt, and a polycarboxylic acid having two or more carboxylic acid groups. Further a secondary battery according to one aspect of the present disclosure has a positive electrode, a negative electrode, and the electrolyte solution.

Advantageous Effects of Invention

According to the present disclosure, there can be provided an electrolyte solution which may extend the potential region where no electrolysis occurs, and enable a lithium ion secondary battery which is safe and high in voltage and high in capacity.

DESCRIPTION OF EMBODIMENTS

Figure 1:
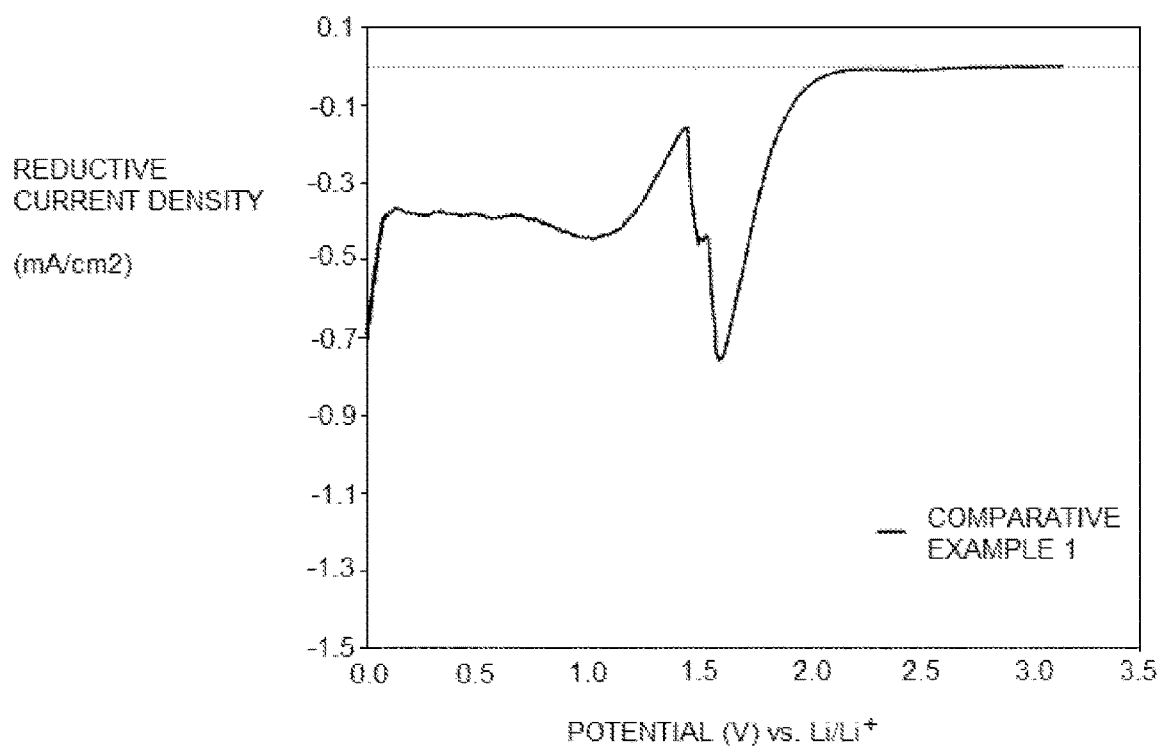
FIG. 1 is a graph showing a result of linear sweep voltammetry (LSV) of Comparative Example 1.
Figure 2:
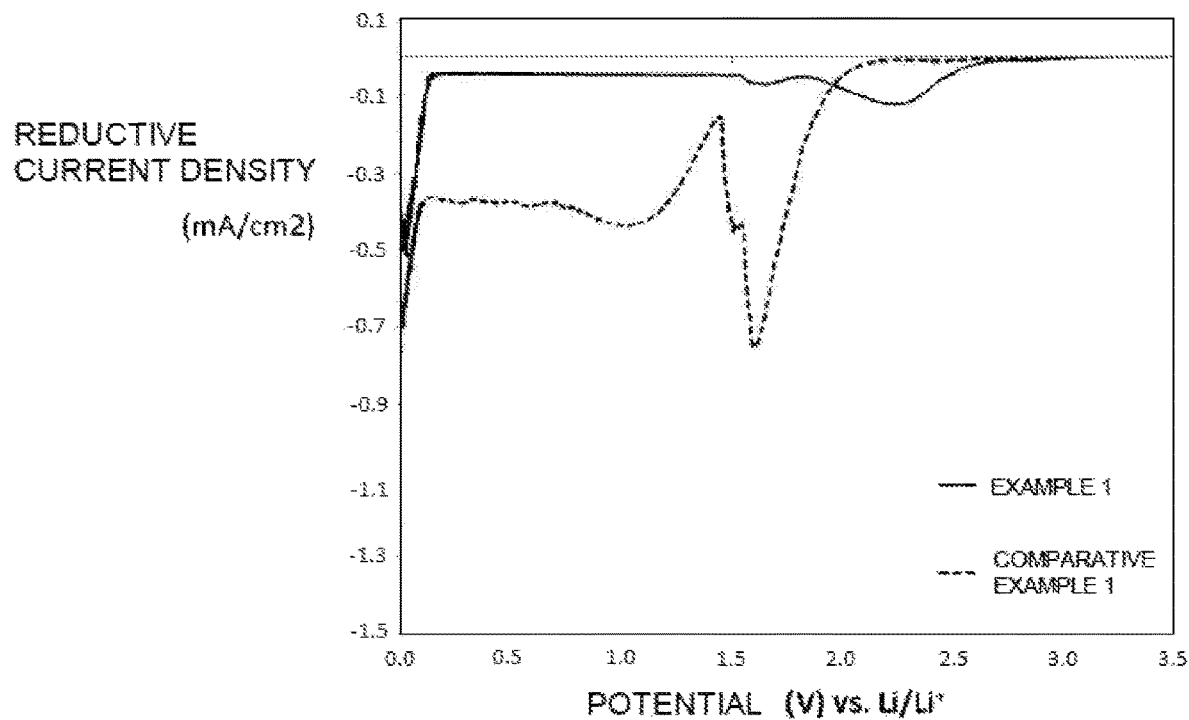
FIG. 2 is a graph of a result of LSV measurement of Example 1.
Figure 3:
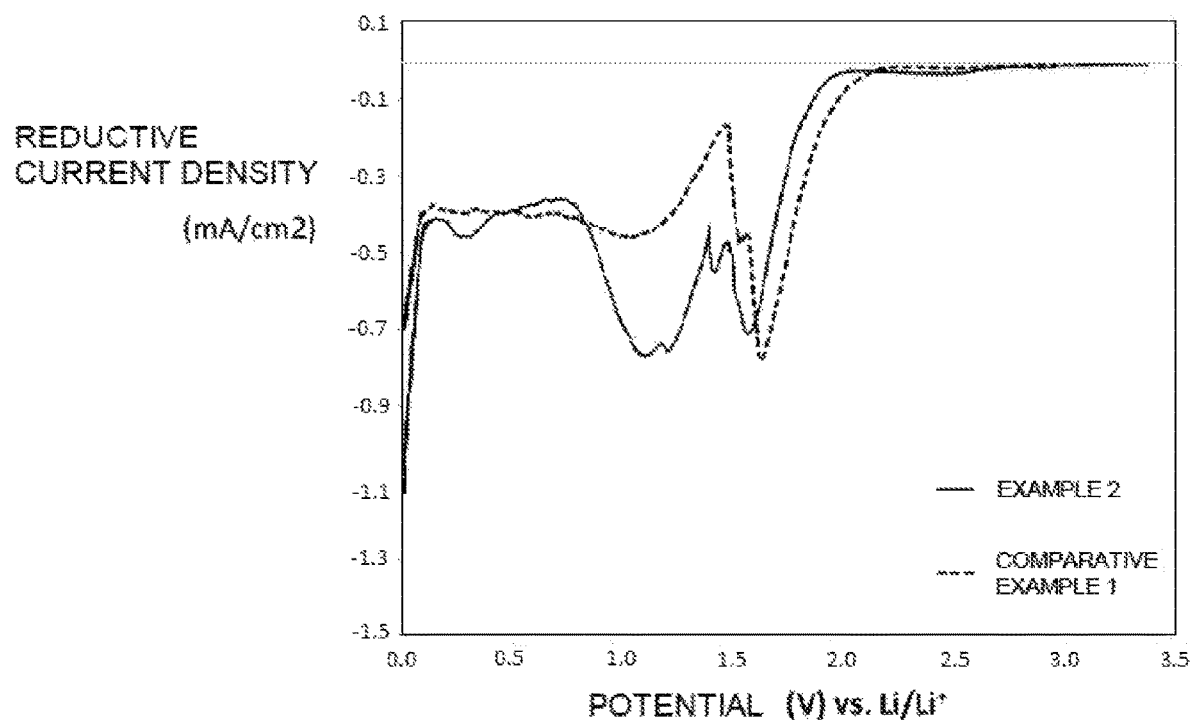
FIG. 3 is a graph of a result of LSV measurement of Example 2.
Figure 4:
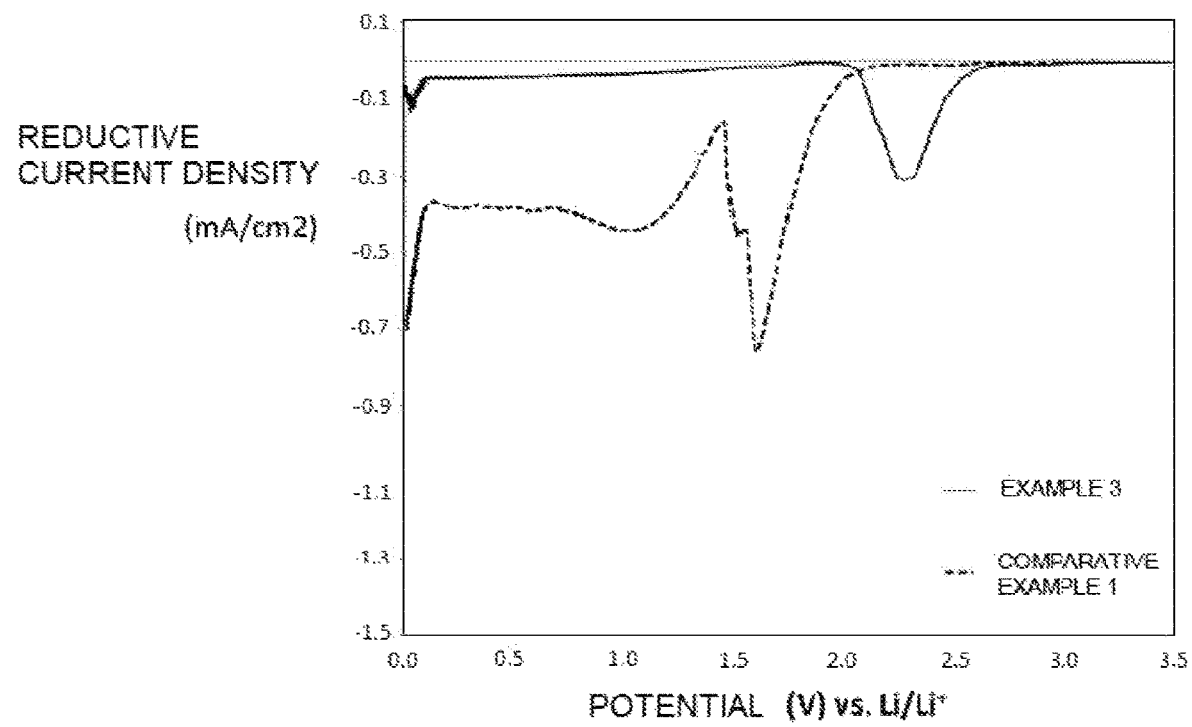
FIG. 4 is a graph of a result of LSV measurement of Example 3.
Figure 5:
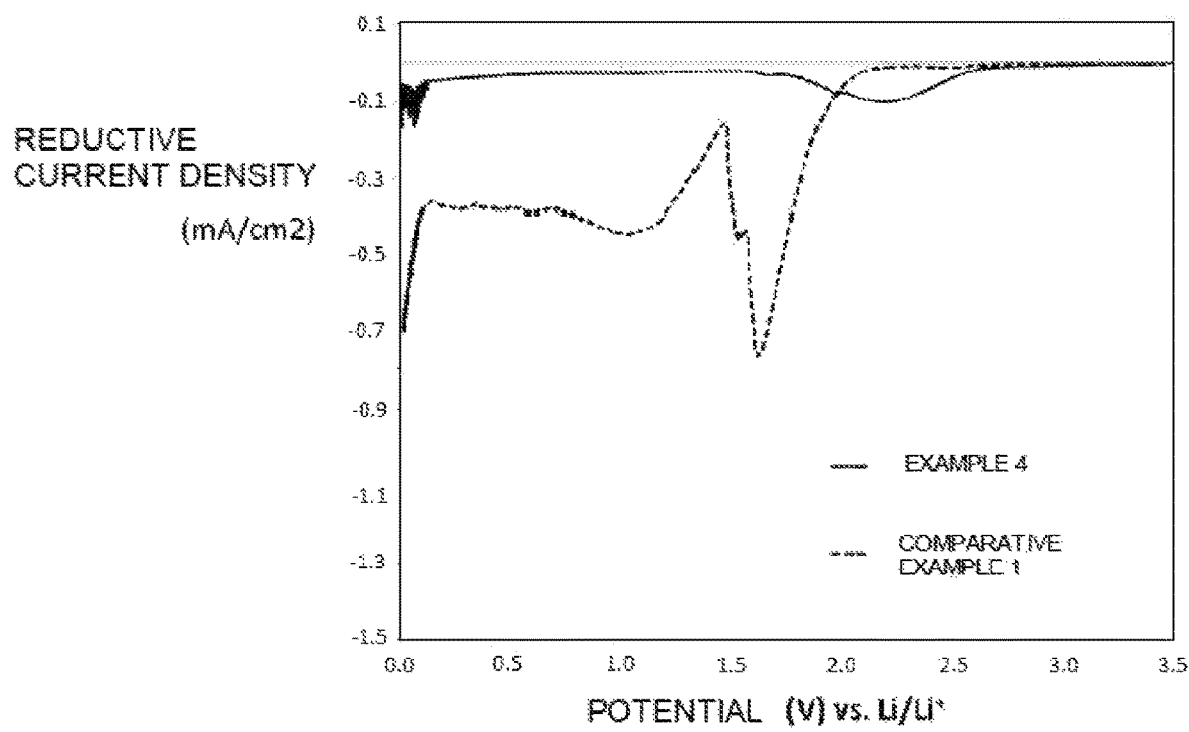
FIG. 5 is a graph of a result of LSV measurement of Example 4.
Figure 6:
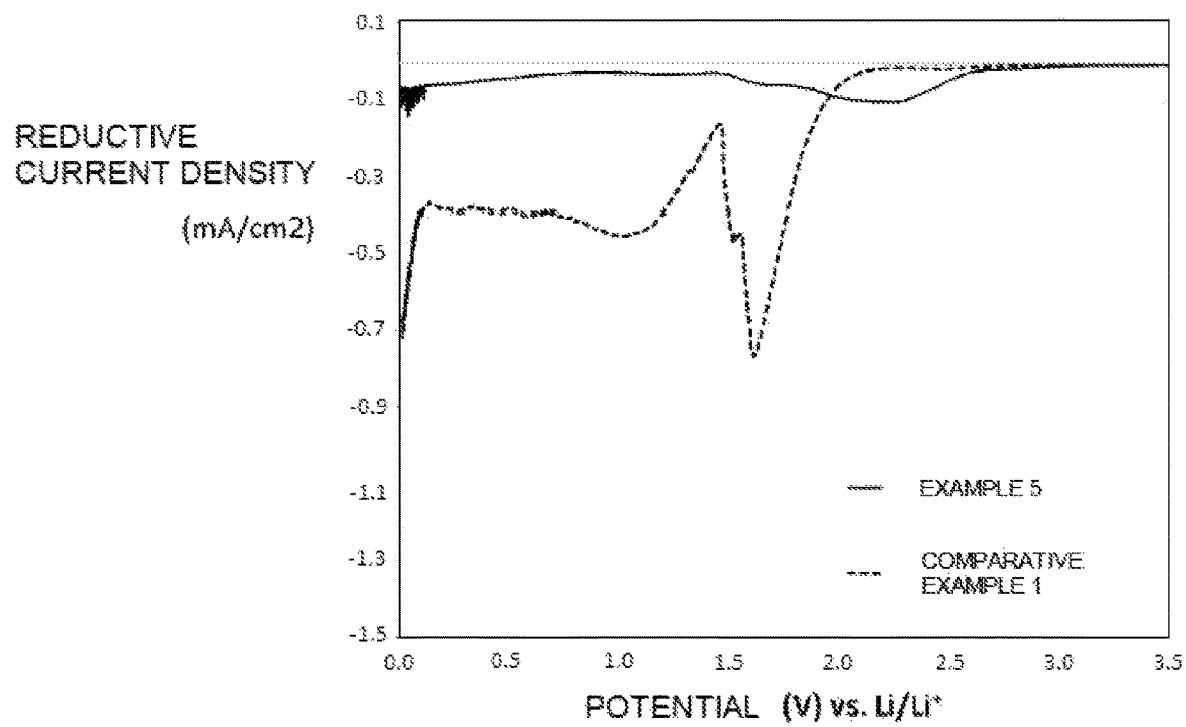
FIG. 6 is a graph of a result of LSV measurement of Example 5.
Figure 7:
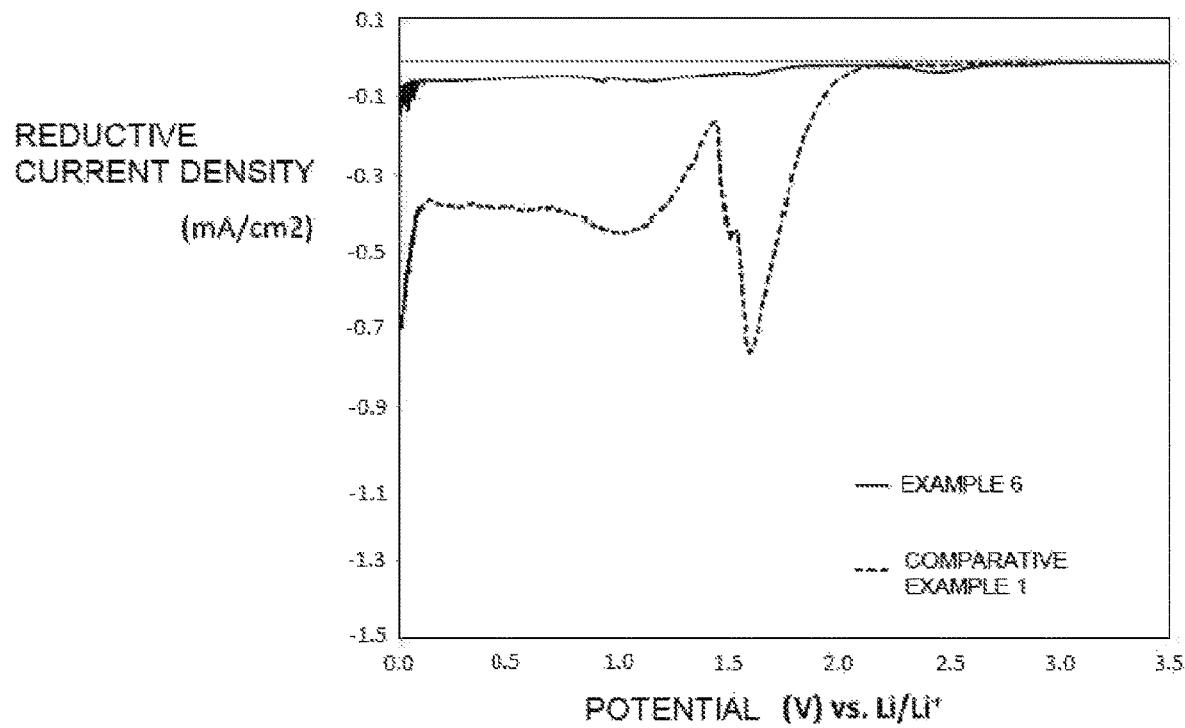
FIG. 7 is a graph of a result of LSV measurement of Example 6.
Figure 8:
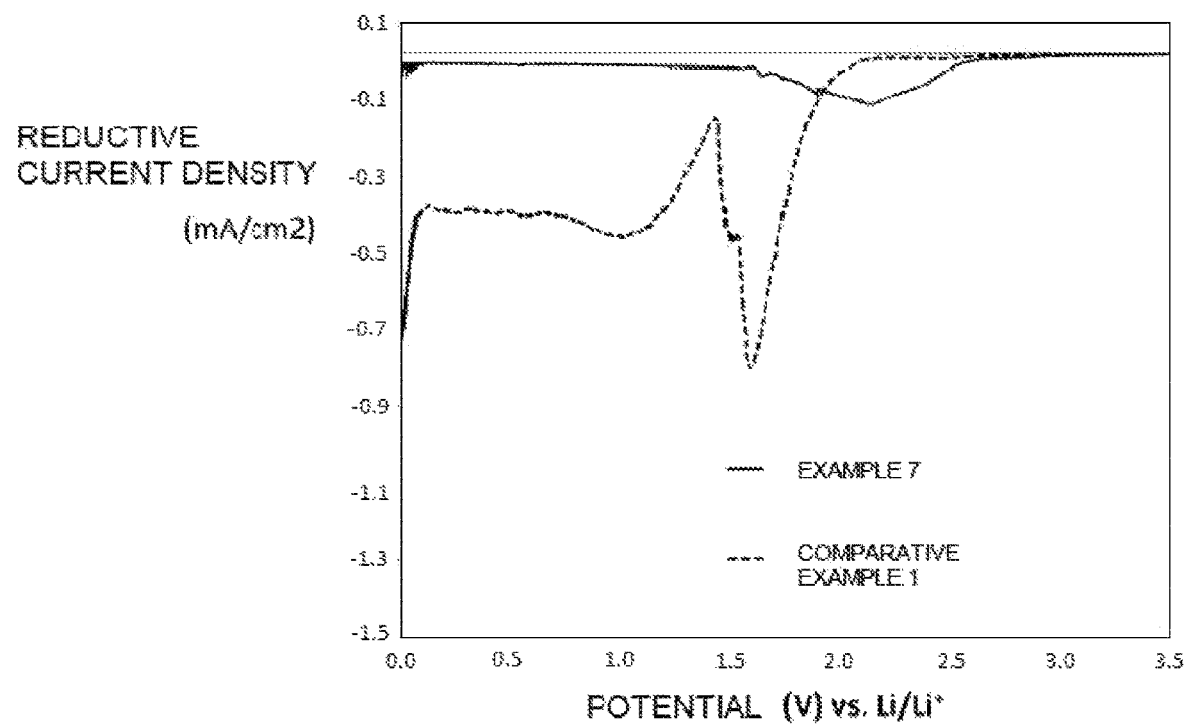
FIG. 8 is a graph of a result of LSV measurement of Example 7.
Figure 9:
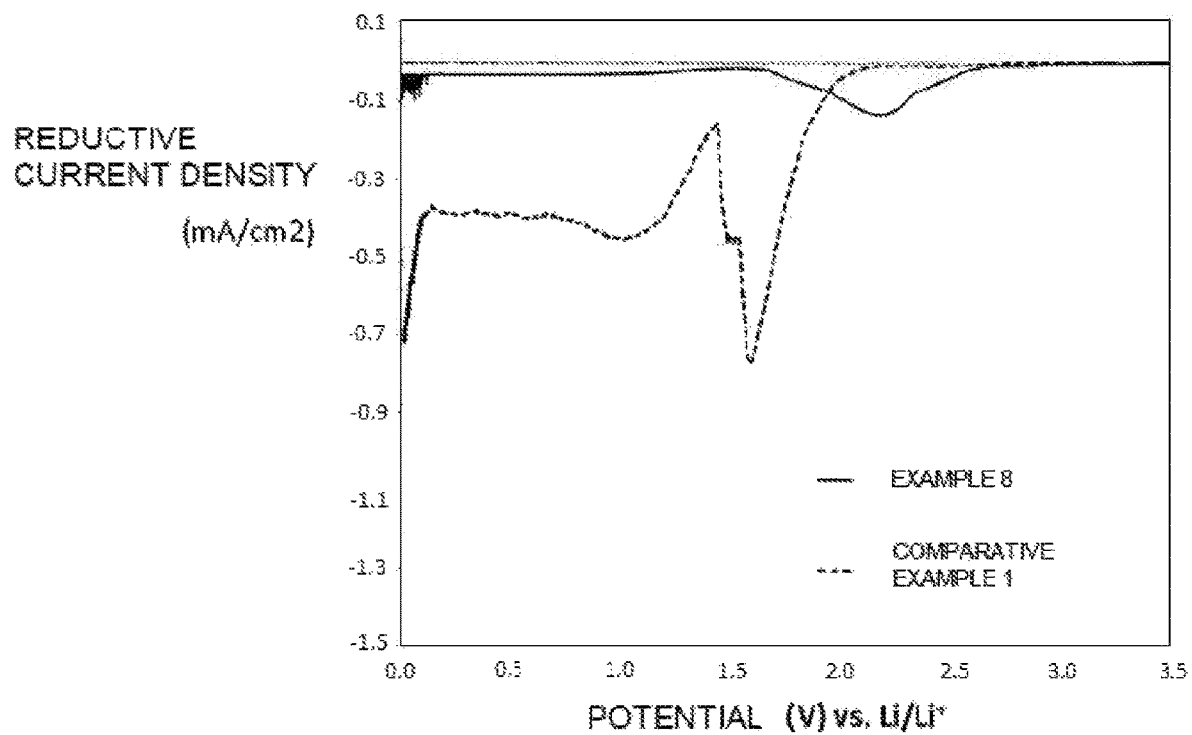
FIG. 9 is a graph of a result of LSV measurement of Example 8.
Figure 10:
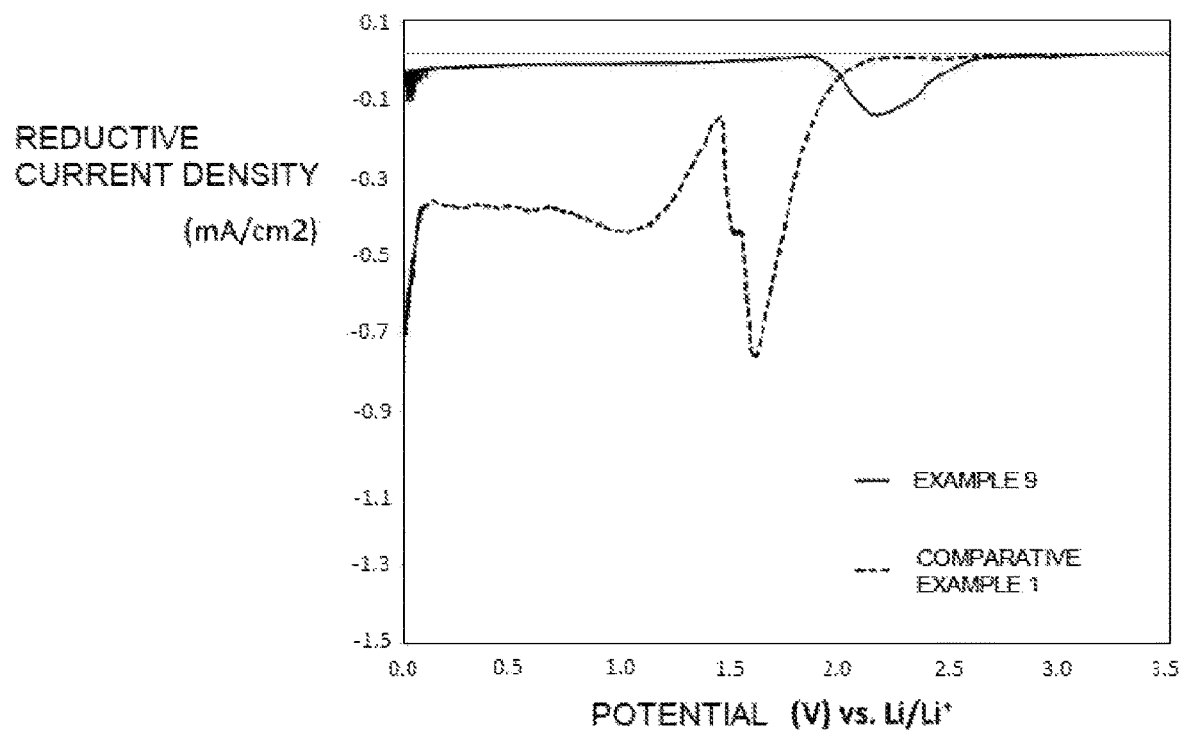
FIG. 10 is a graph of a result of LSV measurement of Example 9.
Figure 11:
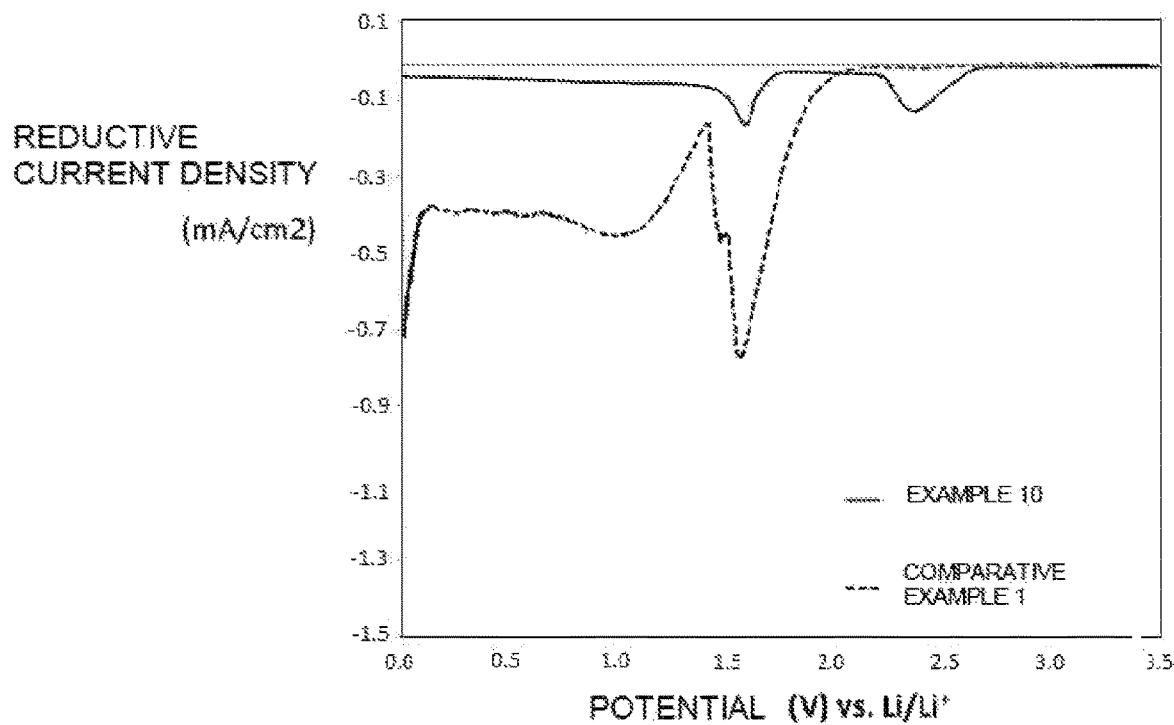
FIG. 11 is a graph of a result of LSV measurement of Example 10.
Figure 12:
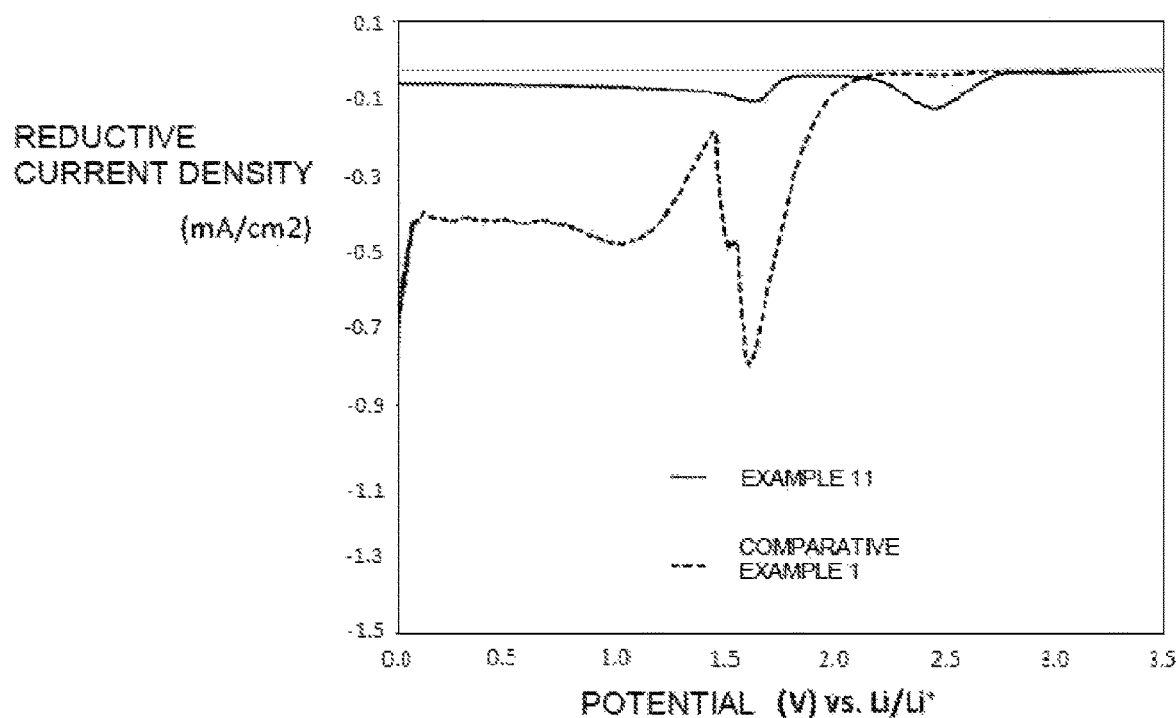
FIG. 12 is a graph of a result of LSV measurement of Example 11.
Figure 13:
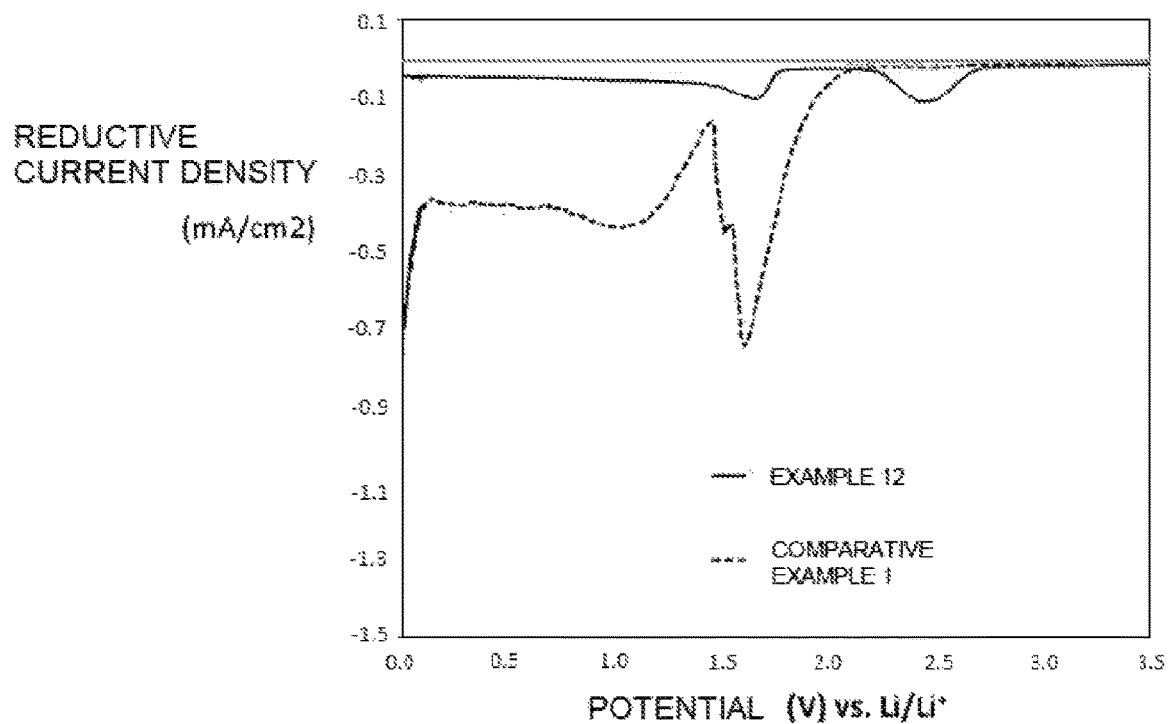
FIG. 13 is a graph of a result of LSV measurement of Example 12.
Figure 14:
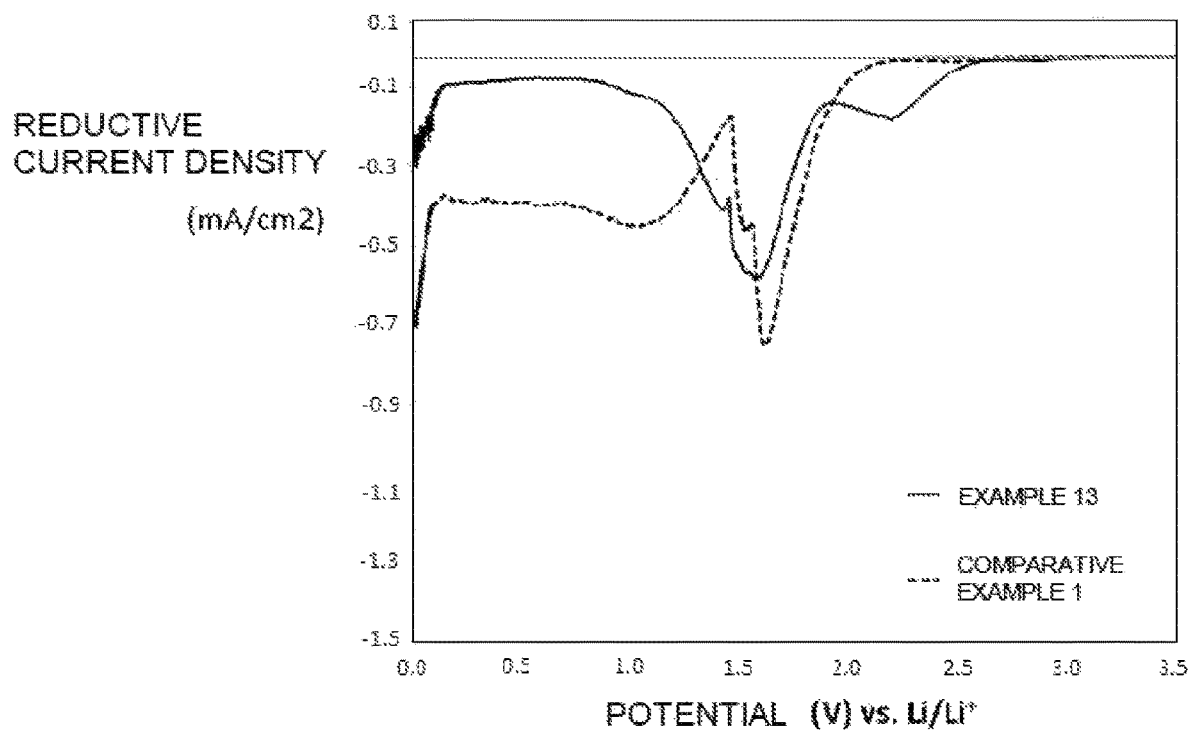
FIG. 14 is a graph of a result of LSV measurement of Example 13.
Figure 15:
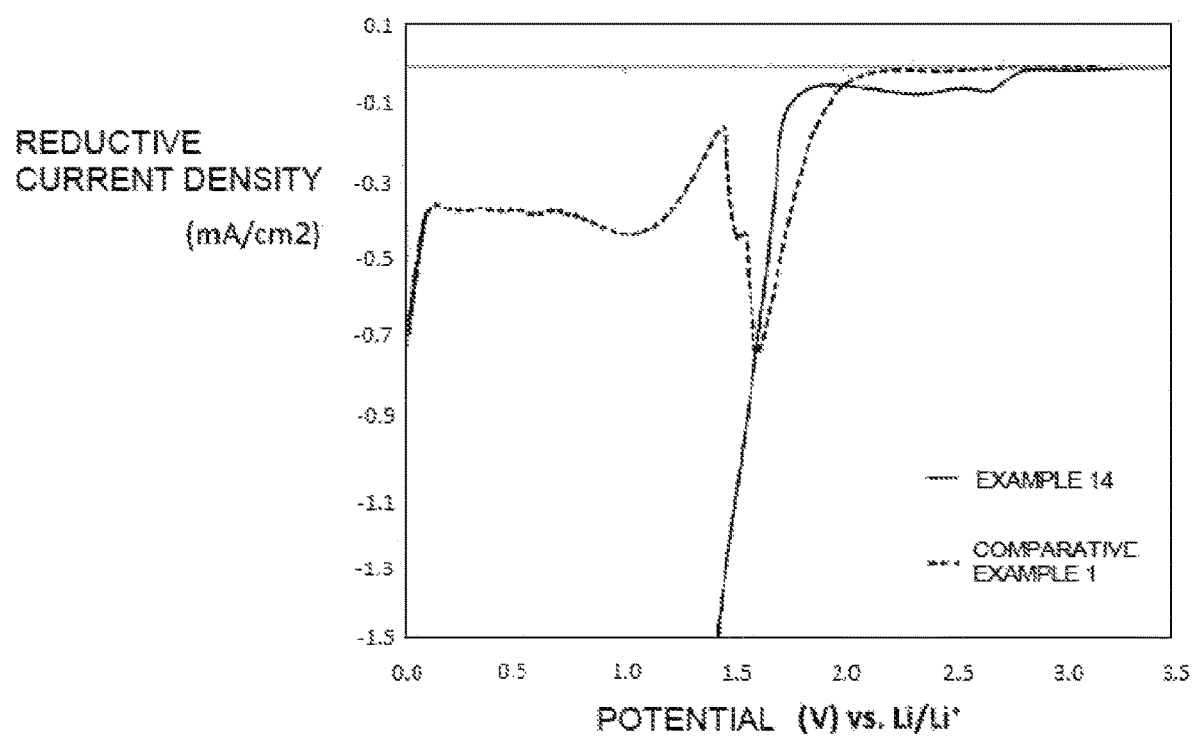
FIG. 15 is a graph of a result of LSV measurement of Example 14.

When a lithium ion secondary battery uses an electrolyte solution containing water as a solvent (in the present specification, also described as "aqueous electrolyte solution"), since water theoretically decomposes at a voltage of 1.23 V, there is a desire for the development of a lithium ion secondary battery which operates without water decomposition and operates stably even when a higher voltage is applied. Patent Literature 1 and 2 disclose that by setting the content of each of an alkaline metal salt and a solvent contained in an electrolyte solution to be in a specific range, there can be provided a power storage device such as a lithium ion secondary battery which operates at a high voltage and stably compared with conventional ones. However, in order to materialize stable operation at a higher voltage in the lithium ion secondary battery and the like described in Patent Literature 1 and 2, the problem is that the potential window on the lower potential side is narrow.

As a result of exhaustive studies, the present inventors have found that by adding two or more carboxylic acid groups to an electrolyte solution containing water as a solvent and a lithium salt as an electrolyte salt, the potential window on the lower potential side of the electrolyte solution can be extended, extending the potential region where no electrolysis occurs; and further by using the electrolyte solution, a lithium ion secondary battery which is safe and high in voltage and high in capacity can be realized.

Hereinafter, there will be described an embodiment of an aqueous electrolyte solution and a secondary battery according to one aspect of the present disclosure. The embodiment described below is an example, and the present disclosure is not limited thereto.

[Aqueous Electrolyte Solution]

The aqueous electrolyte solution according to the present embodiment comprises, at least, water, a lithium salt, and a polycarboxylic acid having two or more carboxylic acid groups described below.

(Solvent)

The aqueous electrolyte solution contains water as a main solvent. Here, containing water as a main solvent refers to the content of water based on the total amount of solvents contained in the electrolyte solution being 50% or higher in volume ratio. The content of water contained in the electrolyte solution is preferably 90% or higher in volume ratio based on the total amount of the solvents. The solvent contained in the electrolyte solution may be a mixed solvent containing water and a nonaqueous solvent. Examples of the nonaqueous solvent include aprotic polar solvents such as: alcohols such as methanol; carbonates such as dimethyl carbonate, ethyl methyl carbonate, diethyl carbonate, ethylene carbonate and propylene carbonate; acetone; acetonitrile; and dimethyl sulfoxide.

Since an aqueous electrolyte solution contains water, which has no flammability, as a main solvent, it can enhance the safety of a secondary battery using the aqueous electrolyte solution. From this viewpoint, the content of water is, based on the total amount of the electrolyte solution, preferably 8% by mass or higher, and more preferably 10% by mass or higher. Further the content of water is, based on the total amount of the electrolyte solution, preferably 50% by mass or lower, and more preferably 20% by mass or lower.

(Lithium Salt)

As the lithium salt contained in the aqueous electrolyte solution, any one can be used as long as it is a compound dissolving and dissociating in the solvent containing water to enable lithium ions to be present in the aqueous electrolyte solution. Preferably, the lithium salt does not cause deterioration of battery characteristics due to reaction thereof with materials constituting a positive electrode and a negative electrode. Examples of such a lithium salt include salts with inorganic acids such as perchloric acid, sulfuric acid and nitric acid, salts with halide ions such as chloride ions and bromide ions, and salts with organic anions containing carbon atoms in their structure.

Examples of the organic anions constituting the lithium salt include anions represented by the following general formulas (i) to (iii).

$$(R^1SO_2)(R^2SO_2)N^- \qquad (i)$$

wherein $R^1$ and $R^2$ are each independently selected from halogen atoms, alkyl groups or halogen-substituted alkyl groups, and $R^1$ and $R^2$ may be bound to each other and form a ring.

$$R^3SO_3^- \qquad (ii)$$

wherein $R^3$ is selected from halogen atoms, alkyl groups or halogen-substituted alkyl groups.

$$R^4CO_2^- \qquad (iii)$$

wherein $R^4$ is selected from alkyl groups or halogen-substituted alkyl groups.

In the above general formulas (i) to (iii), the number of carbon atoms of the alkyl group or the halogen-substituted alkyl group is preferably 1 to 6, more preferably 1 to 3, and still more preferably 1 or 2. The halogen of the halogen-substituted alkyl group is preferably fluorine. The number of halogen substitution in the halogen-substituted alkyl group is equal to or less than the number of hydrogen of the original alkyl group. The halogen atom in the above general formulas (i) to (iii) is preferably a fluorine atom.

$R^1$ to $R^4$ each may be, for example, a saturated alkyl group or a saturated halogen-substituted alkyl group, and when $R^1$ and $R^2$ are not bound to each other and do not form a ring, may be a group represented by the following general formula (iv).

$$C_nH_aF_bCl_cBr_dI_e \qquad (iv)$$

wherein n is an integer of 1 or more; and a, b, c, d and e are each an integer of 0 or more, and satisfy 2n+1=a+b+c+d+e.

In the above general formula (iv), from the viewpoint of oxidation resistance, a smaller "a" is preferable, and a=0 is more preferable; and 2n+1=b is most preferable.

Specific examples of organic anions represented by the above general formula (i) include bis(fluorosulfonyl)imide (FSI; $[N(FSO_2)_2]^-$), bis(trifluoromethanesulfonyl)imide (TFSI; $[N(CF_3SO_2)_2]^-$), bis(perfluoroethanesulfonyl)imide (BETI; $[N(C_2F_5SO_2)_2])^-$, and (perfluoroethanesulfonyl)(trifluoromethanesulfonyl)imide ($[N(C_2F_5SO_2)(CF_3SO_2)]^-$); and specific examples of organic anions in which $R^1$ and $R^2$ are bound to each other and form a ring include cTFSI; ($[N(CF_2SO_2)_2]^-$). Specific examples of organic anions represented by the above general formula (ii) include $FSO_3^-$, $CF_3SO_3^-$ and $C_2F_5SO_3^-$. Examples of organic anions represented by the above general formula (iii) include $CF_3CO_2^-$ and $C_2F_5CO_2^-$.

Examples of organic anions other than the above general formula (i) include anions of bis(1,2-benzenedioleate(2-)-O,O')boric acid, bis(2,3-naphthalenedioleate(2-)-O,O')boric acid, bis(2,3-biphenyldioleate(2-)-O,O')boric acid, and bis(5-fluoro-2-oleate-1-benzenesulfonic acid-O,O')boric acid.

An anion constituting the lithium salt is preferably an imide anion. Specific examples of the imide anion include, in addition to imide anions exemplified as organic anions represented by the above general formula (i), (fluorosulfonyl)(trifluoromethanesulfonyl)imide (FTI; $N(FSO_2)(CF_3SO_2)]^-$).

Specific examples of lithium salts having a lithium ion and an imide anion include lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiFSI), and lithium (fluorosulfonyl)(trifluoromethanesulfonyl)imide (LiFTI).

Specific other examples of lithium salts include $CF_3SO_3Li$, $C_2F_5SO_3Li$, $CF_3CO_2Li$, $C_2F_5CO_2Li$, lithium bis(1,2-benzenedioleate(2-)-O,O')borate, lithium bis(2,3-naphthalenedioleate(2-)-O,O)borate, lithium bis(2,2'-biphenyldioleate(2-)-O,O')borate, lithium bis(5-fluoro-2-oleate-1-benzenesulfonic acid-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), and lithium hydroxide.

In the aqueous electrolyte solution according to the present embodiment, the content ratio of water to a lithium salt is, by molar ratio, preferably 15:1 or lower, and more preferably 4:1 or lower. This is because when the content ratio of water to a lithium salt is in these ranges, the potential window of the aqueous electrolyte solution extends and the voltage to be applied to an aqueous secondary battery can be raised more. From the viewpoint of safety of the aqueous secondary battery, the content ratio of water to a lithium salt is preferably 1.5:1 or higher.

(Polycarboxylic Acid)

The aqueous electrolyte solution according to the present embodiment contains a polycarboxylic acid having two or more carboxylic acid groups in one molecule thereof. The polycarboxylic acid includes dicarboxylic acids containing two carboxylic acid groups in one molecule thereof, and tricarboxylic acids or tetracarboxylic acids containing three or more carboxylic acid groups in one molecule thereof. These polycarboxylic acids may be used singly or in combinations of two or more. By adding a polycarboxylic acid, at the time of charge and discharge, the polycarboxylic acid reductively decomposes prior to water on a negative electrode and forms a film that is low in solubility to water on the surface of a negative electrode current collector, the surface of a negative electrode active substance, and the surface of a conductive agent. The negative electrode film reduces the area where the negative electrode current collector, the negative electrode active substance, and the conductive agent directly contact water, and improves the resistance of the negative electrode film to reductive decomposition of water, and can extend the potential window to the lower potential side. It is conceivable that since the compound comprises a carboxylic acid group, the negative electrode film comprising $COO^-$ can be formed, enabling the resistance of the negative electrode film to be reduced. Having two carboxylic acid groups enables the negative electrode film having Li conductivity between $COO^-$ to be formed. Containing three or more carboxylic acid groups also enables the negative electrode film having Li conductivity between $COO^-$ to be formed, leading to development of a similar effect. In the case of containing only one carboxylic acid group, since Li conduction between $COO^-$ does not progress smoothly, from the viewpoint of the Li conductivity and the reductive decomposition potential (negative electrode film forming potential), a sufficient effect cannot be attained.

In the aqueous electrolyte solution, the polycarboxylic acid ionizes and produces carboxylate anions. In the present specification, a compound derived from a polycarboxylic acid and present as a carboxylate anion in an electrolyte solution is included in "polycarboxylic acid" for convenience. The polycarboxylic acid to be used for preparation of the aqueous electrolyte solution is not especially limited as long as it ionizes and produces a carboxylate anion in the aqueous electrolyte solution, and a salt of a polycarboxylic acid may be used.

The polycarboxylic acid is represented, for example, by $R(COOH)_n$ or $R(COOLi)_n$. Here, R represents a hydrocarbon group which may have a substituent, and n represents an integer of 2 or more. The hydrocarbon group represented by R may contain one or more selected from the group consisting of an oxygen atom, a nitrogen atom, a sulfur atom, a silicon atom and a fluorine atom. Examples of the substituent which the hydrocarbon group represented by R may have include functional groups having polarity, such as a hydroxyl group, a sulfonic acid group, a phosphoric acid group, an amino group and a nitro group, and hydrocarbon groups substituted by these functional groups. n in the above formula is preferably 2 or more and 4 or less, and more preferably 2 or 3.

The polycarboxylic acid is preferably a dicarboxylic acid having two carboxylic acid groups. Such a dicarboxylic acid is represented, for example, by $R(COOH)_2$ or $R(COOLi)_2$, wherein R is the same as R of the formula representing the above polycarboxylic acid.

Examples of suitable dicarboxylic acids include dicarboxylic acids represented by the following Formula (1) or the following Formula (2).

[Formula 1]

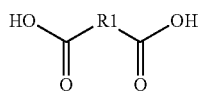 (1)

wherein R1 represents any one of a divalent saturated or unsaturated aliphatic group, a divalent aromatic group and a combination thereof, and the aliphatic group or the aromatic group may have a substituent.

[Formula 2]

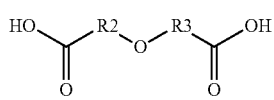 (2)

wherein R2 and R3 each independently represent any one of a divalent saturated or unsaturated aliphatic group, a divalent aromatic group and a combination thereof, and the aliphatic group or the aromatic group may have a substituent.

The divalent saturated or unsaturated aliphatic groups represented by R1 to R3 are substituents obtained by abstracting two hydrogen atoms from chain or cyclic aliphatic compounds, and examples thereof include alkanediyl groups, alkenediyl groups, alkynediyl groups, cycloalkanediyl groups, cycloalkenediyl groups, cycloalkynediyl groups, and combinations thereof. Some carbon atoms constituting the aliphatic group may be substituted by an oxygen atom, a sulfur atom or a nitrogen atom. Examples of the divalent aromatic groups include arylene groups obtained by abstracting two hydrogen atoms from aromatic hydrocarbons, and heteroarylene groups obtained by abstracting two hydrogen atoms from heterocyclic aromatic compounds.

R1, R2 and R3 each preferably represent an alkanediyl group, an alkenediyl group, an alkynediyl group or an arylene group, and more preferably represent an alkanediyl group having 1 to 3 carbon atoms, an alkenediyl group having 2 or 3 carbon atoms, an alkynediyl group having 2 or 3 carbon atoms, or an arylene group having 6 carbon atoms. R1 in the Formula (1) is still more preferably an alkanediyl group, an alkenediyl group or an alkynediyl group, each of which has 2 or 3 carbon atoms, and is especially preferably an ethylene group or a vinylene group. Among these, an ethylene group is especially preferable. This is because as a film produced when the dicarboxylic acid is reductively decomposed, a negative electrode film having Li conductivity between $COO^-$ is densely formed. It is conceivable that as a result of the formation of the dense negative electrode film, a negative electrode film in which the effect of suppressing the reductive decomposition of water is high will be formed, and the effect will be exhibited by the potential window expansion. R2 and R3 in the Formula (2) are each more preferably a methylene group, an ethylene group or a vinyl group, and especially preferably a methylene group. This is because as a film produced when the dicarboxylic acid is reductively decomposed, a negative electrode film having Li conductivity between $COO^-$ is densely formed. It is conceivable that as a result of the formation of the dense negative electrode film, a negative electrode film in which the effect of suppressing the reductive decomposition of water is high will be formed, and the effect will exhibited by the potential window expansion.

Specific examples of the dicarboxylic acid represented by the Formula (1) or (2) include succinic acid, glutaric acid, malonic acid, dimethylmalonic acid, adipic acid, pimelic acid, malic acid, tartaric acid, 2-hydroxymalonic acid, hydroxysuccinic acid, hydroxyglutaric acid, fumaric acid, maleic acid, itaconic acid, citraconic acid, acetylenedicarboxylic acid, 1,2-cyclohexanedicarboxylic acid, 1,4-cyclohexanedicarboxylic acid, diglycolic acid, phthalic acid, isophthalic acid, terephthalic acid and p-xylylenedicarboxylic acid. Among these, preferable are succinic acid, glutaric acid, malonic acid, dimethylmalonic acid, fumaric acid, maleic acid, itaconic acid and diglycolic acid; more preferable are succinic acid, fumaric acid, maleic acid and diglycolic acid; and especially preferable are succinic acid and diglycolic acid.

Specific examples of the tricarboxylic acid which may have a substituent include 1,2,3-propanetricarboxylic acid, butanetricarboxylic acid, pentanetricarboxylic acid, citric acid, isocitric acid, trimellitic acid and naphthalenetricarboxylic acid. Specific examples of the tetracarboxylic acid which may have a substituent include butanetetracarboxylic acid, pentanetetracarboxylic acid, pyromellitic acid and naphthalenetetracarboxylic acid. Here, when an aqueous electrolyte solution comprising a Li salt comprises a polycarboxylic acid, carboxylic acid groups of the polycarboxylic acid can be present as either of COOH and COOLi. This is because an exchange reaction occurs between protons of the polycarboxylic acid and Li in the aqueous electrolyte solution.

The content of the polycarboxylic acid contained in the aqueous electrolyte solution may be, based on the total amount of the aqueous electrolyte solution, for example, 0.1% by mass or higher and 5.0% by mass or lower, and is preferably 0.5% by mass or higher and 3.0% by mass or lower. This is because by setting the content of the polycarboxylic acid to be in the above range, the potential window can be extended more, and the increases in the resistance and the film thickness of a film (described later) to be formed on a negative electrode can be suppressed, whereby the deterioration of load characteristics can be alleviated.

The pH of the aqueous electrolyte solution is not especially limited, and may be, for example, 3 or higher and 14 or lower, and is preferably 6 or higher and 10 or lower. This is because when the pH of the aqueous electrolyte solution is in these ranges, it is possible to improve the stability in the aqueous solution of a positive electrode active substance in a positive electrode, and a negative electrode active substance in a negative electrode, and the occlusion and release reaction of lithium ions in the positive electrode active substance and the negative electrode active substance becomes smoother.

(Additives)

The aqueous electrolyte solution may contain additives, in addition to the solvent containing water as a main component, the electrolyte salt and the polycarboxylic acid. Examples of the additives include fluorophosphate salts, carboxylic anhydrides, alkaline earth metal salts, sulfur compounds, acids and alkalis. Preferably, the aqueous electrolyte solution further comprises at least one among fluorophosphate salts, carboxylic anhydrides, alkaline earth metal salts and sulfur compounds. The content of these additives is, for example, 0.1% by mass or higher and 5.0% by mass or lower based on the total amount of the aqueous electrolyte solution.

Examples of the fluorophosphate salts include fluorophosphoric acid lithium salts represented by the general formula $Li_xPF_yO_z$ ($1 \leq x < 3$, $0 < y \leq 2$, $2 \leq z < 4$). By causing the aqueous electrolyte solution to contain the fluorophosphate salt, the electrolysis of water can be suppressed. Specific examples of the fluorophosphoric acid lithium salt include lithium difuorophosphate ($LiPF_2O_2$) and lithium monofluorophosphate ($Li_2PFO_3$), and $LiPF_2O_2$ is preferable. Here, the fluorophosphate salt represented by the general formula $Li_xPF_yO_z$ may be a mixture of two or more selected from $LiPF_2O_2$, $Li_2PFO_3$ and $Li_3PO_4$, and in this case, x, y and z each may be a numerical value other than an integer.

When the aqueous electrolyte solution contains the fluorophosphate salt, it is conceivable that in the first charge and discharge cycle time, the fluorophosphate salt reductively decomposes on a negative electrode prior to water, and forms a composite film (negative electrode film comprising a fluorophosphate salt component in addition to a polycarboxylic acid component) on the surface of a negative electrode current collector, the surface of a negative electrode active substance, and the surface of a conductive agent. It is conceivable that since the composite film reduces the area where the negative electrode current collector, the negative electrode active substance and the conductive agent directly contact water, the reductive decomposition of water is suppressed, extending the potential window to the lower potential side, and the amount of LiF formed in the negative electrode film is increased, improving the water resistance and the durability of the negative electrode film. The content of the fluorophosphates salt may be, based on the total amount of the aqueous electrolyte solution, for example, 0.1% by mass or higher, and is preferably 0.3% by mass or higher. The content of the fluorophosphoric acid lithium salt may be, based on the total amount of the aqueous electrolyte solution, for example, 3.0% by mass or lower, and is preferably 2.0% by mass or lower.

The alkaline earth metal salt which may be added to the aqueous electrolyte solution is a salt having an alkaline earth metal (group 2 element) ion and an anion such as an organic anion. Examples of the alkaline earth metal include beryllium (Be), magnesium (Mg), calcium (Ca) and strontium (Sr), and magnesium and calcium are preferable.

Examples of the organic anion constituting the alkaline earth metal salt include the organic anions represented by the general formulas (i) to (iii), described as organic anions constituting the above lithium salt. However, anions constituting the alkaline earth metal salt may be anions other than the organic anions represented by the general formulas (i) to (iii), or may be inorganic anions.

The alkaline earth metal salt preferably has a high dissociation constant in the aqueous electrolyte solution, and suitable examples thereof include alkaline earth metal salts of perfluoroalkanesulfonic acid imides, such as $Ca[N(CF_3SO_3)_2]_2$ (CaTFSI), $Ca[N(CF_3CF_3SO_2)_2]_2$ (CaBETI), $Mg[N(CF_3SO_3)_2]_2$ (MgTFSI) and $Mg[N(CF_3CF_3SO_2)_2]_2$ (MgBETI), alkaline earth metal salts of trifluoromethanesulfonic acid, such as $Ca(CF_3SO_3)_2$ and $Mg(CF_3SO_3)_2$, perchloric acid alkaline earth metal salts such as $Ca[ClO_4]_2$ and $Mg[ClO_4]_2$, and tetrafluoroborate salts such as $Ca[BF_4]_2$ and $Mg[BF_4]_2$. Among these, from the viewpoint of the plasticity action, alkaline earth metal salts of perfluoroalkanesulfonic acid imides are more preferable, and CaTFSI and CaBETI are especially preferable. Also preferable are alkaline earth metal salts having the same anion as the Li salt contained in the electrolyte solution.

When the aqueous electrolyte solution contains the alkaline earth metal salt, it is conceivable that in the charge and discharge cycle time, the alkaline earth metal salt will reductively decompose on a negative electrode prior to water, and form a composite film (negative electrode film comprising an alkaline earth metal salt component in addition to a polycarboxylic acid component) on the surface of a negative electrode current collector, the surface of a negative electrode active substance, and the surface of a conductive agent. It is conceivable that since the composite film reduces the area where the negative electrode current collector, the negative electrode active substance, and the conductive agent directly contact water, the reductive decomposition of water is suppressed, extending the potential window to the lower potential side, and a fluoride peculiar to the alkaline earth metal salt (for example, $CaF_2$, $MgF_2$) is formed, improving the water resistance and the durability of the negative electrode. It is conceivable that since the fluoride peculiar to the alkaline earth metal salt (for example, $CaF_2$, $MgF_2$) is lower in solubility to water than LiF, when the amounts of these formed are equal, the formation of a composite film, in which the effect of suppressing the reductive decomposition of water is higher than in the case of adding the fluorophosphate salt, is enabled, exhibiting the effect on further potential window expansion. The alkaline earth metal salts may be used singly or in combinations of two or more. From the viewpoint of the expansion of the potential window to the lower potential side, the content of the alkaline earth metal salt may be, based on the total amount of the aqueous electrolyte solution, for example, 0.5% by mass or higher and 3% by mass or lower, and is preferably 1.0% by mass or higher and 2% by mass or lower.

The carboxylic anhydride which may be added to the aqueous electrolyte solution includes cyclic carboxylic anhydrides and chain carboxylic anhydrides. It is conceivable that by causing the aqueous electrolyte solution to contain the carboxylic anhydride, in the charge and discharge cycle time, a composite film (film originated from the carboxylic anhydride in addition to a film originated from the polycarboxylic acid) will be formed on the surface of a negative electrode current collector, the surface of a negative electrode active substance, and the surface of a conductive agent, and the durability of a negative electrode can be improved. Examples of the cyclic carboxylic anhydride include succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic anhydride and phenylsuccinic anhydride. Examples of the chain carboxylic anhydride include anhydrides of two of the same carboxylic acid or two different carboxylic acids selected from carboxylic acids having 1 to 12 carbon atoms, such as acetic acid, propionic acid, butyric acid and isobutyric acid, and specific examples thereof include acetic anhydride and propionic anhydride.

In the case of adding the carboxylic anhydride to the aqueous electrolyte solution, the carboxylic anhydrides may be used singly or in combinations of two or more. The content of the carboxylic anhydride may be, based on the total amount of the aqueous electrolyte solution, for example, 0.1% by mass or higher and 5.0% by mass or lower, and is preferably 0.3% by mass or higher and 2.0% by mass or lower.

The sulfur compound which may be added to the aqueous electrolyte solution is, for example, an organic compound containing a sulfur atom in the molecule, and includes compounds which are not contained in any of the above lithium salt, polycarboxylic acid and alkaline earth metal salt. By making the aqueous electrolyte solution contain the sulfur compound, it is possible to supplement components contained in the film derived from the reductive reaction of the anions represented by the general formulas (i) to (iii), such as TFSI and BETI, and the hydrogen generation parasitically progressing on a negative electrode can effectively be blocked. Specific examples of the sulfur compound include cyclic sulfur compounds such as ethylene sulfite, 1,3-propanesultone, 1,4-butanesultone, sulfolane and sulfolene; sulfonate esters such as methyl methanesulfonate and busulfan; sulfones such as dimethyl sulfone, diphenyl sulfone and methyl phenyl sulfone; sulfides or disulfides such as dibutyl disulfide, dicyclohexyl disulfide and tetramethyl thiuram monosulfide; and sulfonamides such as N,N-dimethylmethanesulfonamide and N,N-diethylmethanesulfonamide. Among these sulfur compounds, preferable are ethylene sulfite, 1,3-propanesultone, 1,4-butanesultone, sulfolane and sulfolene, and especially preferable is ethylene sulfite.

In the case of adding the sulfur compound to the aqueous electrolyte solution, the sulfur compounds may be used singly or in combinations of two or more. The content of the sulfur compound may be, based on the total amount of the aqueous electrolyte solution, for example, 0.1% by mass or higher and 5.0% by mass or lower, and is preferably 0.3% by mass or higher and 2.0% by mass or lower.

A method for preparing the aqueous electrolyte solution according to the present embodiment is not especially limited, and may be prepared, for example, by suitably mixing water, the lithium salt and the polycarboxylic acid (including the polycarboxylic acid salt), and the additives in the case of being added.

[Secondary Battery]

Hereinafter, a secondary battery according to one example of an embodiment of the present disclosure will be described. The secondary battery as one example of the embodiment has the above-mentioned aqueous electrolyte solution, and a positive electrode and a negative electrode. The secondary battery has, for example, a structure in which an electrode body having the positive electrode, the negative electrode and a separator, and the aqueous electrolyte solution are accommodated in a battery case. The electrode body includes wound-type electrode bodies obtained by winding a positive electrode and a negative electrode through a separator, and laminated-type electrode bodies obtained by laminating a positive electrode and a negative electrode through a separator, but the form of the electrode body is not limited to these types.

The battery case accommodating the electrode body and the aqueous electrolyte solution includes metal or resin cases of cylindrical, rectangular, coin, button or other shapes, and resin cases (laminated-type batteries) obtained by molding a laminated sheet of a metal foil laminated with a resin sheet.

The secondary battery according to the present embodiment may be fabricated by a well-known method, and can be fabricated, for example, by accommodating a wound-type or laminated-type electrode body in a battery case main body, and injecting the aqueous electrolyte solution, and thereafter sealing the opening of the battery case main body by using a gasket and a sealing body.

[Positive Electrode]

A positive electrode constituting the secondary battery according to the present embodiment is constituted, for example, of a positive electrode current collector and a positive electrode active substance layer formed on the positive electrode current collector. The positive electrode active substance layer may be formed on one surface of the positive electrode current collector, or may be formed on both surfaces thereof. The positive electrode active substance layer contains, for example, a positive electrode active substance, a binding agent, a conductive agent.

As the positive electrode current collector, there can be used a foil of a metal which is stable in the potential range of the positive electrode, a film having the metal disposed as the surface layer, or the like. As the positive electrode current collector, there may be used a porous body of a mesh, a punching sheet, an expanded metal or the like of the metal. As the material of the positive electrode current collector, there can be used stainless steel, aluminum, an aluminum alloy, titanium or the like. The thickness of the positive electrode current collector is, from the viewpoint of current collectability, mechanical strength and the like, preferably, for example, 3 μm or larger and 50 μm or smaller. The positive electrode active substance layer contains, for example, a positive electrode active substance, a binding agent, a conductive agent.

The positive electrode is obtained, for example, by applying and drying a positive electrode mixture slurry containing the positive electrode active substance, the conductive agent, the binding agent and the like on the positive electrode current collector to form the positive electrode active substance layer on the positive electrode current collector, and rolling the positive electrode active substance layer. As a disperse medium to be used for the positive electrode mixture slurry, there is used, for example, water, an alcohol such as ethanol, and an ether such as tetrahydrofuran, N-methyl-2-pyrrolidone (NMP). The thickness of the positive electrode active substance layer is not especially limited, and is, for example, 10 μm or larger and 100 μm or smaller.

Examples of the positive electrode active substance include lithium transition metal oxides containing lithium (Li) and a transition metal element(s) such as cobalt (Co), manganese (Mn) or nickel (Ni). The positive electrode active substance also includes transition metal sulfides, metal oxides, lithium-containing polyanionic compounds containing one or more transition metals, such as lithium iron phosphate ($LiFePO_4$) and lithium iron pyrophosphate ($Li_2FeP_2O_7$), sulfur-based compounds ($Li_2S$), and oxygen-containing metal salts such as oxygen and lithium oxide. The positive electrode active substance is preferably a lithium-containing transition metal oxide, and the transition metal element preferably includes at least one of Co, Mn and Ni.

The lithium transition metal oxide may contain other elements added, other than Co, Mn and Ni, and may contain, for example, aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb) and silicon (Si).

Specific examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M is at least one of Na, Mg, Sc, Y, Mn, Fe, Co, Ni, Cu, Zn, Al, Cr, Pb, Sb and B, and $0<x\le1.2$, $0<y\le0.9$ and $2.0\le z\le2.3$). The lithium transition metal oxides may be used singly or as a mixture of two or more. It is preferable, from the viewpoint of the capacity enhancement, that the lithium transition metal oxide contains 80% by mol or more of Ni based on the total amount of the transition metal(s). It is more preferable, from the viewpoint of the stability of the crystal structure, that the lithium transition metal oxide is $Li_aNi_bCo_cAl_dO_2$ ($0<a\le1.2$, $0.8\le b<1$, $0<c<0.2$, $0<d\le0.1$, $b+c+d=1$).

As the conductive agent, there can be used a well-known conductive agent raising the electroconductivity of the positive electrode mixture layer, and examples thereof include carbon powders such as carbon black, acetylene black, Ketjen black and graphite. These may be used singly or in combinations of two or more.

As the binding agent, there can be used a well-known binding agent retaining the good contact state of the positive electrode active substance and the conductive agent and raising the bindability of the positive electrode active substance and the like to the positive electrode current collector surface, and examples thereof include fluorine-containing polymers and rubber-based polymers. Examples of the fluorine-containing polymer include polytetrafluoroethylene (PTFE), polyvinylidene fluoride (PVdF) and modified polymers thereof; and examples of the rubber-based polymer include ethylene-propylene-isoprene copolymers and ethylene-propylene-butadiene copolymers. These may be used singly or in combinations of two or more. The content of the binding agent contained in the positive electrode active substance layer is, based on the total amount of the positive electrode active substance, for example, preferably 0.1% by mass or higher and 20% by mass or lower, and more preferably 1% by mass or higher and 5% by mass or lower. The binding agent may further be used concurrently with a thickener such as carboxymethylcellulose (CMC) or polyethylene oxide (PEO).

[Negative Electrode]

A negative electrode constituting the secondary battery according to the present embodiment is constituted, for example, of a negative electrode current collector and a negative electrode active substance layer formed on the negative electrode current collector. The negative electrode active substance layer may be formed on one surface of the negative electrode current collector, or may be formed on both surfaces thereof. The negative electrode active substance layer contains, for example, a negative electrode active substance, a binding agent.

As the negative electrode current collector, there can be used a foil of a metal which is stable in the potential range of the negative electrode, a film having the metal disposed as the surface layer, or the like. As the negative electrode current collector, there may be used a porous body of a mesh, a punching sheet, an expanded metal or the like of the metal. As the material of the negative electrode current collector, there can be used copper, a copper alloy, aluminum, stainless steel, nickel or the like. The thickness of the negative electrode current collector is, from the viewpoint of current collectability, mechanical strength and the like, preferably, for example, 3 μm or larger and 50 μm or smaller.

The negative electrode can be fabricated, for example, by applying a negative electrode mixture slurry comprising the negative electrode active substance, the binding agent, and a disperse medium on the negative electrode current collector to form a coating film, drying the coating film, and thereafter rolling the resultant to thereby form the negative electrode active substance layer on one surface or both surfaces of the negative electrode active substance layer. The negative electrode active substance layer, as required, may comprise optional components such as a conductive agent. The thickness of the negative electrode active substance layer is not especially limited, and is, for example, 10 μm or larger and 100 μm or smaller.

The negative electrode active substance is not especially limited as long as it is a material capable of occluding and releasing lithium ions. The material constituting the negative electrode active substance may be a non-carbon material or a carbon material, or a combination thereof. The non-carbon material includes lithium metal, alloys containing a lithium element, and metal compounds like metal oxides, metal sulfides and metal nitrides containing lithium. Examples of the alloys containing a lithium element include lithium aluminum alloys, lithium tin alloys, lithium lead alloys and lithium silicon alloys. Examples of the metal oxide containing lithium include metal oxides containing lithium, and titanium, tantalum, niobium, and lithium titanate ($Li_4Ti_5O_{12}$, or the like) is preferable.

Examples of the carbon material to be used as the negative electrode active substance include graphite and hard carbon. Among these, graphite is preferable due to being high in capacity and low in irreversible capacity. Graphite is a general name of carbon materials having a graphite structure, and includes natural graphite, artificial graphite, expandable graphite and graphitized mesophase carbon particles. In the case of using graphite as the negative electrode active substance, since the activity to the reductive decomposition of a nonaqueous electrolyte is decreased, the surface of the negative electrode active substance layer is preferably coated with a film. These negative electrode active substances may be used singly or in combinations of two or more.

As the binding agent contained in the negative electrode active substance layer, for example, as in the case of the positive electrode, a fluorine-containing polymer, and a rubber-based polymer may be used, and a styrene-butadiene copolymer (SBR) or a modified copolymer thereof may also be used. The content of the binding agent contained in the negative electrode active substance layer is, based on the total amount of the negative electrode active substance, preferably 0.1% by mass or higher and 20% by mass or lower, and more preferably 1% by mass or higher and 5% by mass or lower. Examples of a thickener contained in the negative electrode active substance layer include carboxymethylcellulose (CMC) and polyethylene oxide (PEO). These may be used singly or in combinations of two or more.

[Separator]

A separator is not especially limited as long as it is one through which lithium ions permeate and which electrically separates the positive electrode and the negative electrode, and for example, a porous sheet constituted of a resin, or an inorganic material is used. Specific examples of the porous sheet include microporous thin films, woven fabrics and nonwoven fabrics. The resin material constituting the separator includes olefinic resins such as polyethylene and polypropylene, polyamide, polyamideimide and cellulose. The inorganic material constituting the separator includes glasses and ceramics of borosilicate glass, silica, alumina, titania. The separator may be a laminated body having a cellulose fiber layer and a thermoplastic resin fiber layer of an olefinic resin or the like. The separator may also be a multilayer separator containing a polyethylene layer and a polypropylene layer, or there may be used a separator having a material such as an aramid resin or a ceramic applied on the surface thereof.

In the above embodiment, a secondary battery having the aqueous electrolyte solution has been described, but the aqueous electrolyte solution according to one example of the present embodiment may be used for a power storage device other than the secondary battery, and may be used, for example, for a capacitor. In this case, the capacitor has the aqueous electrolyte solution according to one example of the present embodiment, and two electrodes. The electrode material constituting the electrodes may be a material capable of being used for the capacitor and capable of occluding and releasing lithium ions, and examples thereof include materials containing graphite such as natural graphite or artificial graphite, and materials such as lithium titanate.

EXAMPLES

Hereinafter, Examples in the present disclosure and Comparative Example will be described specifically, but the present disclosure is not limited to the following Examples.
[Preparation of Aqueous Electrolyte Solutions]

Preparation Example 1

Lithium bis(trifluoromethanesulfonyl)imide (LiN$(SO_2CF_3)_2$), lithium bis(perfluoroethanesulfonyl)imide (LiN$(SO_2C_2F_5)_2$), and water (ultrapure water) were mixed in a molar ratio of 0.7:0.3:2. Succinic acid in an amount equivalent to a concentration of 1% by mass based on the total amount of an electrolyte solution to be prepared was added to the obtained mixed liquid to thereby prepare the electrolyte solution of Preparation Example 1. The content of water based on the total amount of the electrolyte solution was 10% by mass, and the molar ratio of water and the lithium salts contained in the electrolyte solution was 2:1. Succinic acid is one example of a polycarboxylic acid and is a dicarboxylic acid represented by the Formula 1 wherein R1 is an ethylene group.

Preparation Example 2

An electrolyte solution of Preparation Example 2 was prepared as in Preparation Example 1, except for adding succinic acid in an amount equivalent to a concentration of 0.2% by mass based on the total amount of the electrolyte solution. The content of water based on the total amount of the electrolyte solution was 10% by mass, and the molar ratio of water and the lithium salts contained in the electrolyte solution was 2:1.

Preparation Example 3

An electrolyte solution of Preparation Example 3 was prepared as in Preparation Example 1, except for adding succinic acid in an amount equivalent to a concentration of 3.0% by mass based on the total amount of the electrolyte solution. The content of water based on the total amount of the electrolyte solution was 10% by mass, and the molar ratio of water and the lithium salts contained in the electrolyte solution was 2:1.

Preparation Example 4

LiN$(SO_2CF_3)_2$ and (LiN$(SO_2C_2F_5)_2$, and water (ultrapure water) were mixed in a molar ratio of 0.7:0.3:2. Succinic acid in an amount equivalent to a concentration of 1% by mass based on the total amount of an electrolyte solution to be prepared and lithium difluorophosphate (LiPF$_2$O$_2$) in an amount equivalent to a concentration of 0.5% by mass based on the total amount of the electrolyte solution were added to the obtained mixed liquid to thereby prepare the electrolyte solution of Preparation Example 4. The content of water based on the total amount of the electrolyte solution was 10% by mass, and the molar ratio of water and the lithium salts contained in the electrolyte solution was 2:1.

Preparation Example 5

An electrolyte solution of Preparation Example 5 was prepared as in Preparation Example 4, except for adding lithium difluorophosphate in an amount equivalent to a concentration of 1.0% by mass based on the total amount of the electrolyte solution. The content of water based on the total amount of the electrolyte solution was 10% by mass, and the molar ratio of water and the lithium salts contained in the electrolyte solution was 2:1.

Preparation Example 6

An electrolyte solution of Preparation Example 6 was prepared as in Preparation Example 5, except for adding calcium bis(trifluoromethanesulfonyl)imide (CaTFSI) in place of lithium difluorophosphate. The content of water based on the total amount of the electrolyte solution was 10% by mass, and the molar ratio of water and the lithium salts contained in the electrolyte solution was 2:1.

Preparation Example 7

An electrolyte solution of Preparation Example 7 was prepared as in Preparation Example 5, except for adding succinic anhydride in place of lithium difluorophosphate. The content of water based on the total amount of the electrolyte solution was 10% by mass, and the molar ratio of water and the lithium salts contained in the electrolyte solution was 2:1.

Preparation Examples 8 and 9

Electrolyte solutions of Preparation Examples 8 and 9 were prepared as in Preparation Examples 4 and 5, respectively, except for adding ethylene sulfite in place of lithium difluorophosphate. The content of water based on the total amount of each electrolyte solution was 10% by mass, and the molar ratio of water and the lithium salts contained in each electrolyte solution was 2:1.

Preparation Examples 10 to 12

Electrolyte solutions of Preparation Examples 10 to 12 were prepared as in Preparation Examples 1, 4 and 5, respectively, except for adding diglycolic acid in place of succinic acid. The content of water based on the total amount of each electrolyte solution was 10% by mass, and the molar ratio of water and the lithium salts contained in each electrolyte solution was 2:1. Diglycolic acid is a polycarboxylic acid, and is a dicarboxylic acid represented by the Formula 2 wherein each of R2 and R3 is a methylene group.

Preparation Example 13

An electrolyte solution of Preparation Example 13 was prepared as in Preparation Example 1, except for adding glutaric acid in place of succinic acid. The content of water based on the total amount of the electrolyte solution was 10% by mass, and the molar ratio of water and the lithium salts contained in the electrolyte solution was 2:1. Glutaric acid is a polycarboxylic acid, and is a dicarboxylic acid represented by the Formula 1 wherein R1 is a propylene group.

Preparation Example 14

An electrolyte solution of Preparation Example 14 was prepared as in Preparation Example 1, except for adding maleic acid in place of succinic acid. The content of water based on the total amount of the electrolyte solution was 10% by mass, and the molar ratio of water and the lithium salts contained in the electrolyte solution was 2:1. Maleic acid is one of polycarboxylic acids, and is a dicarboxylic acid represented by the Formula 1 wherein R1 is a vinylene group.

Preparation Example 15

An electrolyte solution of Preparation Example 15 was prepared by mixing $LiN(SO_2CF_3)_2$ and $(LiN(SO_2C_2F_5)_2$ and water in a molar ratio 0.7:0.3:2. The content of water based on the total amount of the electrolyte solution was 10% by mass, and the molar ratio of water and the lithium salts contained in the electrolyte solution was 2:1.

[Linear Sweep Voltammetry]

As Comparative Example 1, the linear sweep voltammetry measurement (in the present specification, also described as "LSV measurement") was carried out by using the electrolyte solution obtained in Preparation Example 15. The measurement was carried out by using a three-electrode type electrochemical cell having a copper foil (manufactured by Nilaco Corp.) as a working electrode, platinum (manufactured by BASF AG) as a counter electrode and Ag/AgCl (3M NaCl) (manufactured by BASF AG) as a reference electrode. The LSV measurement was carried out under the condition of a temperature of 25° C. at a sweep speed of 0.1 mV/sec from an open circuit potential (OCV) to −3.238 V (vs. Ag/AgCl(3M NaCl)). Here, the finish potential of the LSV measurement was equal to 0 V (vs. Li/Li$^+$). FIG. 1 shows a result of the LSV measurement of Comparative Example 1.

As Examples 1 to 14, the LSV measurement was carried out similarly to the above by using the electrolyte solutions of Preparation Examples 1 to 14. FIGS. 2 to 15 show results of the LSV measurement of Examples 1 to 14. For comparison, FIGS. 2 to 15 show also the LSV measurement result of Comparative Example 1.

The reductive current densities (unit: mA/cm$^2$) at a potential of 1.6 V (vs. Li/Li$^+$) (−1.638 V (vs. Ag/AgCl(3M NaCl)) were measured for the LSV measurement times of each of Example and Comparative Example 1. The numerical values of the measured reductive current densities are shown in Table 1. The effect of extending the region on the lower potential side of the potential window was evaluated from these numerical values, for each electrolyte solution used in the each Example and Comparative Example 1. The potential of 1.6 V (vs. Li/Li$^+$) was a potential bringing about a reductive peak in the LSV measurement of Comparative Example 1, which was carried out by using the electrolyte solution of Preparation Example 15, which contained no polycarboxylic acid nor additives.

TABLE 1

| | Electrolyte solution | | | | Reductive current density (mA/cm² @1.6 V (vs. Li/Li⁺)) |
|---|---|---|---|---|---|
| | Polycarboxylic acid | | Additive | | |
| | kind | content (% by mass) | kind | content (% by mass) | |
| Example 1 | succinic acid | 1.0 | — | — | −0.07 |
| Example 2 | succinic acid | 0.2 | — | — | −0.60 |
| Example 3 | succinic acid | 3.0 | — | — | −0.01 |
| Example 4 | succinic acid | 1.0 | $LiPF_2O_2$ | 0.5 | −0.02 |
| Example 5 | succinic acid | 1.0 | $LiPF_2O_2$ | 1.0 | −0.05 |
| Example 6 | succinic acid | 1.0 | CaTFSI | 1.0 | −0.03 |
| Example 7 | succinic acid | 1.0 | succinic anhydride | 1.0 | −0.03 |
| Example 8 | succinic acid | 1.0 | ES | 0.5 | −0.02 |
| Example 9 | succinic acid | 1.0 | ES | 1.0 | −0.02 |
| Example 10 | diglycolic acid | 1.0 | — | — | −0.14 |
| Example 11 | diglycolic acid | 1.0 | $LiPF_2O_2$ | 0.5 | −0.08 |
| Example 12 | diglycolic acid | 1.0 | $LiPF_2O_2$ | 1 | −0.09 |
| Example 13 | glutaric acid | 1.0 | — | — | −0.56 |
| Example 14 | maleic acid | 1.0 | — | — | −0.72 |
| Comparative Example 1 | none | — | — | — | −0.75 |

* In Table, "$LiPF_2O_2$" represents lithium difluorophosphate; "CaTFSI" represents calcium bis(trifluoromethanesulfonyl)imide; and "ES" represents ethylene sulfite.

As is clear from FIG. 1 to FIG. 15 and Table 1, in Examples 1 to 14, which used electrolyte solutions of Preparation Examples 1 to 14, each containing the polycarboxylic acid, compared with Comparative Example 1, which used the electrolyte solution of Preparation Example 15 containing no polycarboxylic acid, it was indicated that the potential window was extended to the lower potential side. Here, peaks emerging in the region of 2.0 V (vs. Li/Li⁺) to 2.8 V (vs. Li/Li⁺) in each graph of FIG. 2 to FIG. 15 indicated that the polycarboxylic acid was reductively decomposed and the negative electrode film was formed, and did not indicate the generation of hydrogen by reduction of water, that is, the boundary on the lower potential side of the potential window. It was confirmed that the aqueous electrolyte solution containing the polycarboxylic acid added therein could thus extend the potential region where no electrolysis occurred, and use of the aqueous electrolyte solution enabled materialization of a lithium ion secondary battery which is safe and high in voltage and high in capacity.

Among Examples 1 to 14, in Examples 4 to 9, and 11 and 12, which used electrolyte solutions containing, as an additive, any one of the fluorophosphate salt, the carboxylic anhydride, the alkaline earth metal salt and the sulfur compound, compared with the cases of containing none of these additives, it was confirmed that the electrolyte solutions were ones which could further extend the potential region where no electrolysis occurred and enabled materialization of a lithium ion secondary battery higher in voltage and higher in capacity.

Further from comparison of the reductive current density at 1.6 V (vs. Li/Li⁺) between Example 1, Example 13 and Example 14, and Comparative Example 1, shown in Table 1, although, with regard to R1 in the compound represented by the formula 1, any of an ethylene group (Example 1), a propylene group (Example 13) and a vinylene group (Example 14) had the effect of extending the region on the lower potential side of the potential window, the ethylene group exhibited a larger effect. Further, from comparison of the reductive current density at 1.6 V (vs. Li/Li⁺) between Example 10 and Comparative Example 1, shown in Table 1, the current density of diglycolic acid of Example 10 was low, and the effect of extending the region on the lower potential side of the potential window was large. Therefore, when R2 and R3 in the compound represented by the Formula 2 were methylene groups, the effect was large.

The invention claimed is:
1. An electrolyte solution, comprising:
   water;
   a lithium salt; and
   a dicarboxylic acid having two carboxylic acid groups;
   wherein a content of the water is 8% by mass or higher and 20% by mass or lower based on a total amount of the electrolyte solution,
   wherein the lithium salt comprises a lithium ion and an imide anion,
   wherein a content ratio of the water to the lithium salt contained in the electrolyte solution is 4:1 or lower by molar ratio,
   wherein a content of the dicarboxylic acid is 0.5% by mass or higher and 3.0% by mass or lower based on a total amount of the electrolyte solution,
   wherein the dicarboxylic acid is diglycolic acid.
2. The electrolyte solution according to claim 1, further comprising:
   at least one of a fluorophosphate salt, a carboxylic anhydride, an alkaline earth metal salt and a sulfur compound.
3. The electrolyte solution according to claim 1, wherein the content of the water is 8% by mass or higher and 10% by mass or lower based on the total amount of the electrolyte solution.
4. A secondary battery, comprising:
   a positive electrode;
   a negative electrode; and
   an electrolyte solution according to claim 1.

* * * * *